(12) United States Patent
Michaelis et al.

(10) Patent No.: US 7,046,363 B2
(45) Date of Patent: May 16, 2006

(54) OPTICAL MEASUREMENT SYSTEM AND METHOD

(75) Inventors: Alexander Michaelis, Leverkusen (DE); Oliver Genz, Saxony (DE); Ulrich Mantz, Saxony (DE)

(73) Assignee: Infineon Technologies AG, Munich (DE)

( * ) Notice: Subject to any disclaimer, the term of this patent is extended or adjusted under 35 U.S.C. 154(b) by 242 days.

(21) Appl. No.: 10/236,448

(22) Filed: Sep. 6, 2002

(65) Prior Publication Data

US 2004/0046958 A1 Mar. 11, 2004

(51) Int. Cl.
*G01N 21/55* (2006.01)

(52) U.S. Cl. .................... 356/445; 356/448
(58) Field of Classification Search ............ 356/445, 356/448, 369, 601, 630
See application file for complete search history.

(56) References Cited

U.S. PATENT DOCUMENTS 6,031,614 A * 2/2000 Michaelis et al. .......... 356/369
6,079,256 A * 6/2000 Bareket ..................... 73/105
6,462,818 B1 * 10/2002 Bareket ..................... 356/401
6,483,580 B1 * 11/2002 Xu et al. ................... 356/300
6,486,951 B1 * 11/2002 Hirosawa et al. .......... 356/369
6,590,656 B1 * 7/2003 Xu et al. ................... 356/369
6,638,671 B1 * 10/2003 Ausschnitt et al. ........ 356/401

* cited by examiner

*Primary Examiner*—Michael P. Stafira
*Assistant Examiner*—Juan D. Valentin, II
(74) *Attorney, Agent, or Firm*—Slater & Matsil, L.L.P.

(57) ABSTRACT

An apparatus and method for measuring feature sizes having form birefringence. The method includes providing a surface having surface features thereon; radiating the surface features with light having a first wavelength and a first polarization; measuring a reflected polarization of light having the first wavelength reflected from the surface features; rotating the surface features by rotating the surface to measure the reflected polarization of the reflected light having the first wavelength at least one new rotated position; radiating the surface features with light having a second wavelength and the first polarization; measuring a reflected polarization of light having the second wavelength reflected from the surface features; rotating the surface features by rotating the surface to measure the reflected polarization of the reflected light having the second wavelength at least one new rotated position; and correlating the reflected polarization from the light having the first and second polarizations to surface feature sizes.

11 Claims, 15 Drawing Sheets

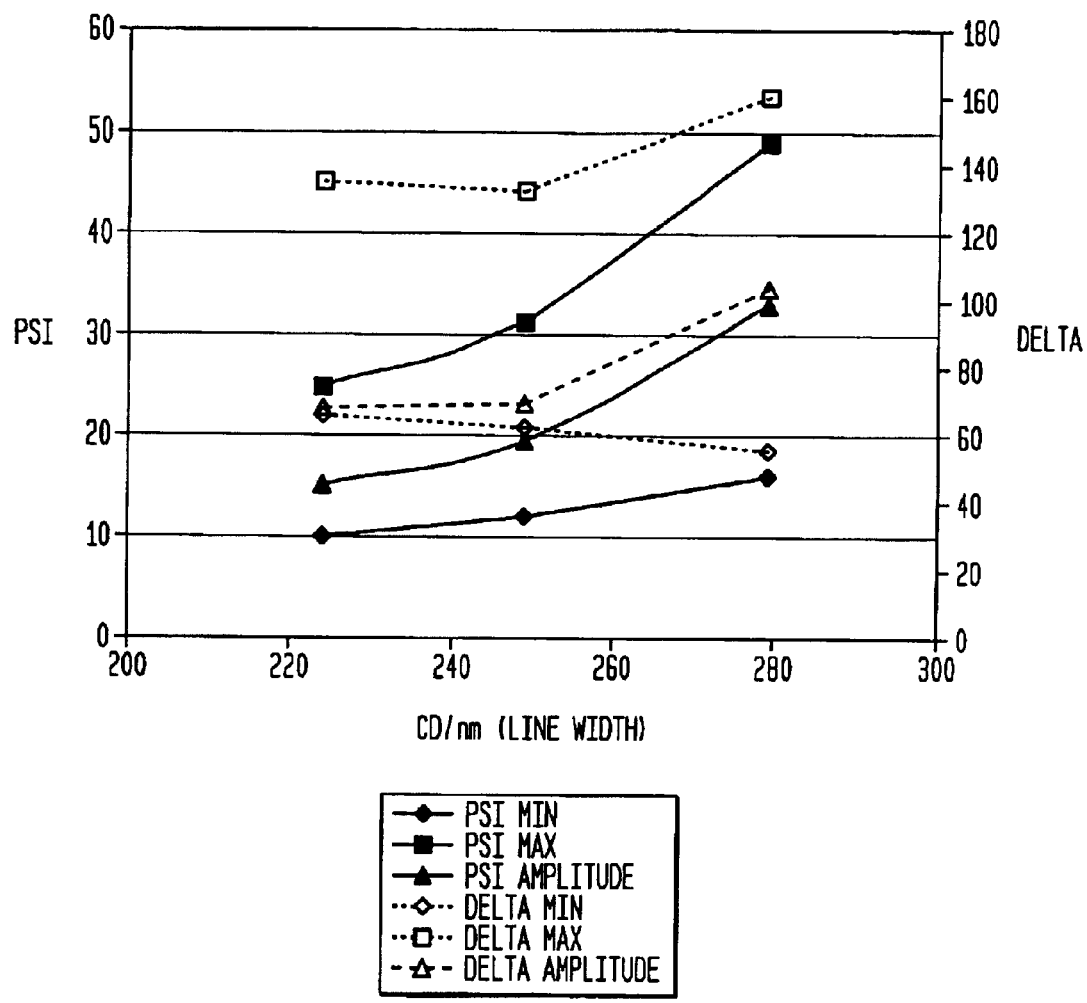

OPTICAL MEASUREMENT SYSTEM AND METHOD

This disclosure relates to measurements systems and methods and more particularly, to a system and method for measuring sub-quarter micron dimensions in semiconductor devices. These dimensions are known as critical dimensions (cd).

BACKGROUND AND SUMMARY OF THE INVENTION

As is known in the art, in semiconductor fabrication critical dimensions below 1 micron are typically measured with top-down scanning electron microscopy. Although a useful measurement tool, scanning electron microscopes have several disadvantages. These disadvantages include, among other things, charging a sample to be measured and increased risk of contamination.

Scanning electron microscopy (SEM) is used principally to provide images at or near the surface of a solid, such as a semiconductor chip. By scanning an electron beam across the surface of a specimen, a one-to-one correspondence can be set up in the positions of the probe upon the specimen and the electron beam on an imaging device, for example an oscillograph. The signal produced is brightness modulated to provide a visual image. As described, SEM requires the bombardment of the specimen with an electron beam. This charges the specimen and may cause damage to semiconductor devices. Further, the electron beam may produce mass transport of atoms on the specimen which may lead to contamination of various regions of the semiconductor device. SEM and atomic force microscopy (AFM) are also limited, in that these techniques primarily measure individual structures on the surface of a semiconductor device rather than structure assemblies.

Therefore, a need exists for a method and system with improved resolution for subquarter micron measurements. A further need exists for a method and system for making such measurements without charging on contaminating a sample being measured. A still further need exists for performing such measurements on structure assemblies thus improving the statistical value of the measurement. Further, there is a need to measure taper angles (i.e., vertical profiles of features) in addition to critical dimensions (i.e., lateral dimensions) of submicron structures.

As we have described in our issued U.S. Pat. No. 6,031,614, the entire subject matter thereof being incorporated herein by reference, a method and apparatus for determining critical dimensions. Such method and apparatus include a conventional microellipsometer provided with a revolving stage. The method and apparatus realize a new kind of measurement tool which we call an Anisotropy Micro-Ellipsometer (AME) (i.e., a revolving ellipsometer). As explained in our U.S. Pat. No. 6,031,614, such an AME allows the measure of critical dimensions (cd) of sub-micron structure assemblies with high resolution without any of the aforementioned drawbacks. Conventional ellipsometry is well known in the art, and offers the advantage of being non-destructive and non-invasive to a sample. Conventional ellipsometers are used to measure optical parameters of surfaces and thickness of films which cover surfaces. For this, measurements on stationary samples are performed. Here, we extend the methods described in our U.S. Pat. No. 6,031,614 to measure vertical dimensions without requiring top-down and cross-sectional SEMs, i.e., the method in accordance with this invention is non-destructive. Further, film thickness can be monitored simultaneously. The method provides sufficient precision for groundrules of 100 nm and below.

Thus, in summary, the production of sub-micron microelectronic devices requires an accurate measurement of both the lateral (usually called "critical dimensions", cd's) as well as vertical sizes (e.g., thickness, depth) of the design structures. In the general case of a vertical profile, an additional quantity is necessary for a complete description of the structure, such as the taper angle, $\tau$. The taper angle quantifies the variation of critical dimension as a function of structure depth. This invention uses the optical methods which we refer to as Spectroscopic Anisotropy Micro-Ellipsometry (SAME) to determine all three quantities, i.e., critical dimension, thickness and taper angle of patterned structures, such as deep trench DRAM arrays or contact holes, non-destructively. For this, the invention makes use of:

(1) wavelength dependence of the penetration depth, $\delta$, of a light beam which is reflected from a sample surface, where $\delta=\lambda/(2nk)$; with $\lambda$ being the wavelength of the light and k being the absorption coefficient which itself is dependant on $\lambda$ as well;

(2) combination of the well-known Bruggeman effective medium theory (BEMA) with SAME. The BEMA approach assumes mixtures or structures on a scale smaller than the wavelength of light, but that each constituent retains its original response and can therefore be applied to sub-micron structures. The generalized form for BEMA is:

$$\sum_f f_i \frac{N_i - N_{ave}}{N_i + 2N_{ave}} = 0,$$

where $N_{ave}$ is the composite complex refractive index $N_{ave}=n+jk$, $N_i$ and $f_1$ are the complex refractive index and volume fraction respectively for the i'th constituent, n is the conventional refractive index, $j=\sqrt{-1}$, and k is the absorption coefficient.

Conventionally, BEMA is applied to unordered mixtures. In the case of periodic structures, which are important here, an additional effect occurs namely form birefringence. This effect causes the system to be optically anisotropic even with isotropic constituents. Consequently, the optical properties of the system now have to be described by the so-called dielectric (3*3) tensor containing the ordinary $N_0$ and extraordinary $N_{eo}$ complex refractive indicies. In order to apply the BEMA approach, an averaged N, namely $N_{ave}=1/3N_{eo1}+1/3N_{eo2}$ is used resulting in a scalar volume fraction, f.

In accordance with the invention, a new optical method which we refer to as Spectroscopy Anisotropy Micro-Ellipsometery (SAME) is used for determination of the dielectric of the dielectric tensor N which then is converted into $N_{ave}$ and subsequently used in the BEMA-equation above. Both an apparatus (revolving ellipsometer) as well as methods to derive taper angle, $\tau$, quantitatively or by calibration are used. The method according to the invention allows the measurement of an assembly of structures thus improving the statistical value of the measurement. The assembly-size can be adjusted as desired and depends on the spot size of the used optical apparatus only.

In accordance with one embodiment of the invention, a system is provided for measuring surface features having form birefringence. The system includes a radiation source for providing radiation having a selectable wavelength incident on a surface having surface features. A radiation detecting device is provided for measuring characteristics of the incident radiation after being reflected from the surface features, such measurement being made at each of a plurality of the selectable wavelengths. A rotating stage is included for rotating the surface such that incident radiation at each of the plurality of selectable wavelengths is directed at different angles due to the rotation of the rotating stage. A processor is provided for processing the measured characteristics of the reflected light for each of the plurality of selectable wavelengths and correlating the characteristics to measure the surface features.

In one embodiment, a method is provided for measuring feature sizes having form birefringence. The method includes providing a surface having surface features thereon; radiating the surface features with light having a first wavelength and a first polarization; measuring a reflected polarization of light having the first wavelength reflected from the surface features; rotating the surface features by rotating the surface to measure the reflected polarization of the reflected light having the first wavelength at least one new rotated position; radiating the surface features with light having a second wavelength and the first polarization; measuring a reflected polarization of light having the second wavelength reflected from the surface features; rotating the surface features by rotating the surface to measure the reflected polarization of the reflected light having the second wavelength at least one new rotated position; and correlating the reflected polarization from the light having the first and second polarizations to surface feature sizes.

In accordance with one embodiment of the invention, an apparatus is provided for measuring critical dimensions on an anisotropic sample at a high lateral resolution, such anisotropic sample showing form birefringence. The apparatus includes an ellipsometer for measuring ellipsometric parameters $\Delta$ and $\Psi$. The ellipsometer directs a linearly polarized incident light having a selectable wavelength onto a selected area of the sample to generate an elliptically polarized reflected light. The ellipsometer compares the linearly polarized incident light and the elliptically polarized reflected light at each of a plurality of the selectable wavelengths to measure the ellipsometric parameters $\Delta$ and $\Psi$. A rotating stage is rotatably disposed below the ellipsometer for rotating said sample so as to vary an angle of rotation $\alpha$ about a center of rotation axis, said center of rotation axis being aligned with the ellipsometer wherein said ellipsometer correlates said ellipsometric parameters $\Delta$ and $\Psi$ to said angle of rotation $\alpha$ to determine the critical dimension at said selected area of the sample at a high lateral resolution.

As is also known in the art, it is important to determine rotational error, diff$\alpha$, between two overlaying patterns.

In accordance with another feature of the invention, a method is provided for determine rotational error, diff$\alpha$, between two overlaying patterns. The method includes, radiating the first pattern with light having a first polarization; measuring a reflected polarization of light having the first wavelength reflected from the surface features; determining a dielectric tensor from such measured reflected light; generate the second pattern over the first pattern; radiating the first pattern with the second pattern over the first pattern with light having the first polarization; measuring a reflected polarization of light from the first and overlaying second patterns; determining both the dielectric tensor and the Euler angles of the second pattern using the determined dielectric tensor of the first pattern to the determine rotational error, diff$\alpha$.

In one embodiment the method includes: measuring $\Delta$ ($\alpha$) and $\Psi$ ($\alpha$), curves of a first pattern showing birefringence; determine the dielectric tensor components of the first pattern by fitting the measured $\Delta$ ($\alpha$) and $\Psi$ ($\alpha$) curves of this first pattern; generating the second pattern over the first pattern; measuring $\Delta$ ($\alpha$) and $\Psi$ ($\alpha$) curves of this two overlaying patterns; determining both the dielectric tensor and the Euler angles of the second pattern using the aforementioned dielectric tensor of the first pattern as known parameters.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 2C is an illustration of CD calibration curves for AME;

Like reference symbols in the various drawings indicate like elements.

DETAILED DESCRIPTION

Figure 1:
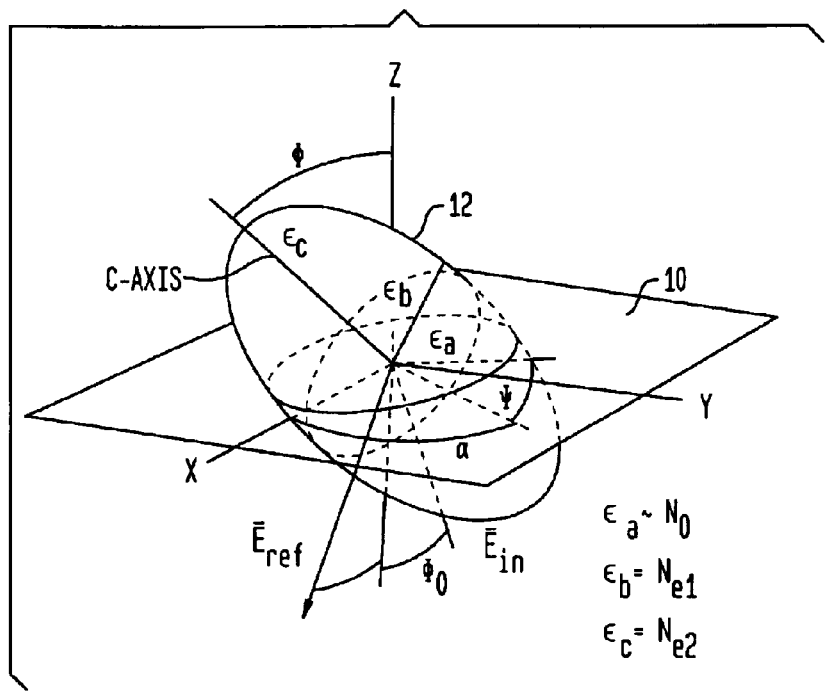
FIG. 1 is an illustration of the so-called dielectric tensor and its orientation with respect to the sample surface and ellipsometric plane of incidence.

This disclosure relates to measurement systems and methods and more particularly, to a system and method for measuring sub-quarter micron dimensions in semiconductor devices. The production of sub-micron microelectronic devices needs an accurate measurement technique for measuring lateral (critical dimensions (cd)) and vertical feature sizes (thicknesses) of designed structure on structure surfaces. The present invention employs form birefringence to measure features of structured surfaces, such as a semiconductor chip, with high resolution. A system and method are disclosed which permit a simultaneous determination of both lateral and vertical feature sizes. The present invention further permits the measurement of an assembly of structures thus improving a statistical value of the measurement. An assembly size to be measured may be adjusted depending on a spot size of the light beam focused on the sample. The lateral resolution is in the order of about 1 nm. In a case of an ordered arrangement of structures where the structures have a size which is large compared with molecular dimensions and small compared to the wavelength of light, an optical anisotropy results. This physical phenomenon is called form birefringence. The structures generated in sub-micron generations of current microelectronic devices fall into this regime. This means that the contact hole, trench or line structures generated with photolithography and etch techniques are optically anisotropic even if these structures include optically isotropic materials. This physical characteristic often disturbs, if not prevent, the use of conventional optical methods (e.g., ellipsometry, spectroscopy).

The present invention describes a new and novel method and system for optically measuring structures, preferably structures on semiconductor devices. The method of measurement of the present invention will be referred to generally as anisotropy micro-ellipsometry (AME). AME makes use of form birefringence and permits the determination of both lateral and vertical feature sizes. AME has all the advantages of ellipsometry including a non-invasive, highly sensitive measurement technique, yet can measure both lateral and vertical feature sizes. AME also provides a means to use and transfer vertical sensitivity of ellipsometry to the measurement of lateral dimensions simultaneously and in-situ, i.e., during fabrication or in between process steps without causing contamination or charging as with SEM.

Structures used in sub-micron generations of current semiconductor devices, for example in memory chips, show birefringence based on geometry rather than material properties. This translates to anisotropic optical systems when light is incident upon a surface of a sample to be measured. Optical properties of any anisotropic system are completely described by a 3×3 complex dielectric tensor. In its main axis system this tensor includes extraordinary complex refractive indices $N_{e1}$, $N_{e2}$ and an ordinary complex refractive index $N_0$ as its diagonal elements. The complex quantities N are defined as N=n+ik where n is the conventional refractive index and k is an absorption coefficient (i is a unit complex number).

For each particular structure, a quantitative correlation between the feature sizes of the structure and the optical parameters of the structure exist. For example, in the case of a line and space structure the relationship is given as:

$$N_e^2 - N_0^2 = \frac{f_1 f_2 (N_1^2 - N_2^2)^2}{f_1 N_2^2 - f_2 N_1^2},$$

where $f_1 = cd_1/(cd_1+cd_2)$, $f_2 = cd_2/(cd_1+cd_2)$ with $cd_1$=line width (critical dimension) and $cd_2$=line spacing. $N_1$ is the complex refractive index of the line material (which is usually isotropic), $N_2$ is the complex refractive index of the space material (e.g., air=1). Any line and space structure is optically uniaxial. This causes the following relation to be true: $N_{e1}=N_{e2}=N_e$. From the equation above, it becomes clear that once the elements of the dielectric tensor are measured, the critical dimensions can be determined quantitatively. For more irregular structures or for other structures in general, a corresponding equation can be derived.

Furthermore, critical dimensions may be determined by the calibration method described below. As is well known in the art, conventional ellipsometry is the most sensitive measurement technique for optical parameters. Ellipsometry measures the change of the state of polarization of a linearly polarized light beam reflected from a sample surface. After reflection, the light is elliptically polarized. Ellipsometry measures the state of polarization of elliptically polarized light by measuring two quantities, i.e., the angles Δ, Ψ. As is well known, any ellipsis is completely determined by two quantities. Therefore, the state of polarization is completely determined by Δ and Ψ. Since two quantities are measured for each cycle, both the real and imaginary part of a complex refractive index can be determined with one measurement regarding isotropic systems.

Conventional ellipsometers can resolve 0.01 degrees in Δ and Ψ. For a typical system, a layer thickness difference of 100 nm causes a Δ-change of about 360 degrees. Therefore, vertical feature size changes in the Angstrom regime can be detected. With the same accuracy, the optical parameters can be determined. In its main axis system the dielectric tensor includes 3 complex numbers (6 parameters) namely $N_{e1}$, $N_{e2}$ and $N_0$. Consequently, determination of this tensor requires at least three independent ellipsometric measurements (three Δ and Ψ pairs). This can be achieved by variation of Euler angles during the ellipsometric measurements.

Referring now in specific detail to the drawings in which like reference numerals identify similar or identical elements throughout the several views, and referring initially to FIG. 1, the Euler angles αφΦ describe the orientation of the dielectric tensor with respect to a sample surface 10 and an ellipsometric plane of incidence 12. As mentioned above, the dielectric tensor contains the refractive indices $N_0$, $N_{e1}$, $N_{e2}$. The Euler angle α simply can be varied by rotation of the sample around its surface normal. Additionally, an azimuth angle of the polarizer of the used ellipsometer can be varied.

Figure 2A:
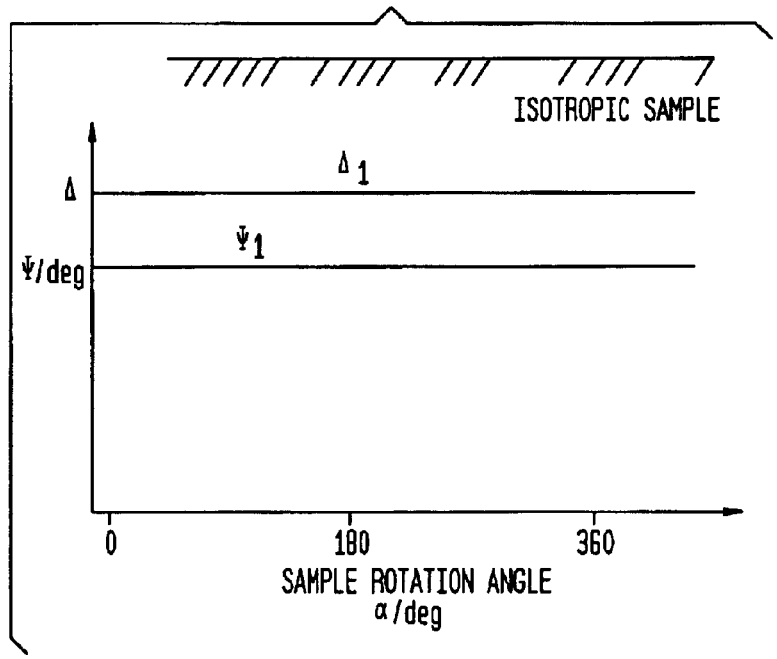
FIG. 2A is an illustration of an ellipsometric measurement on a sample without any features (i.e., a homogeneous isotropic surface)
Figure 2B:
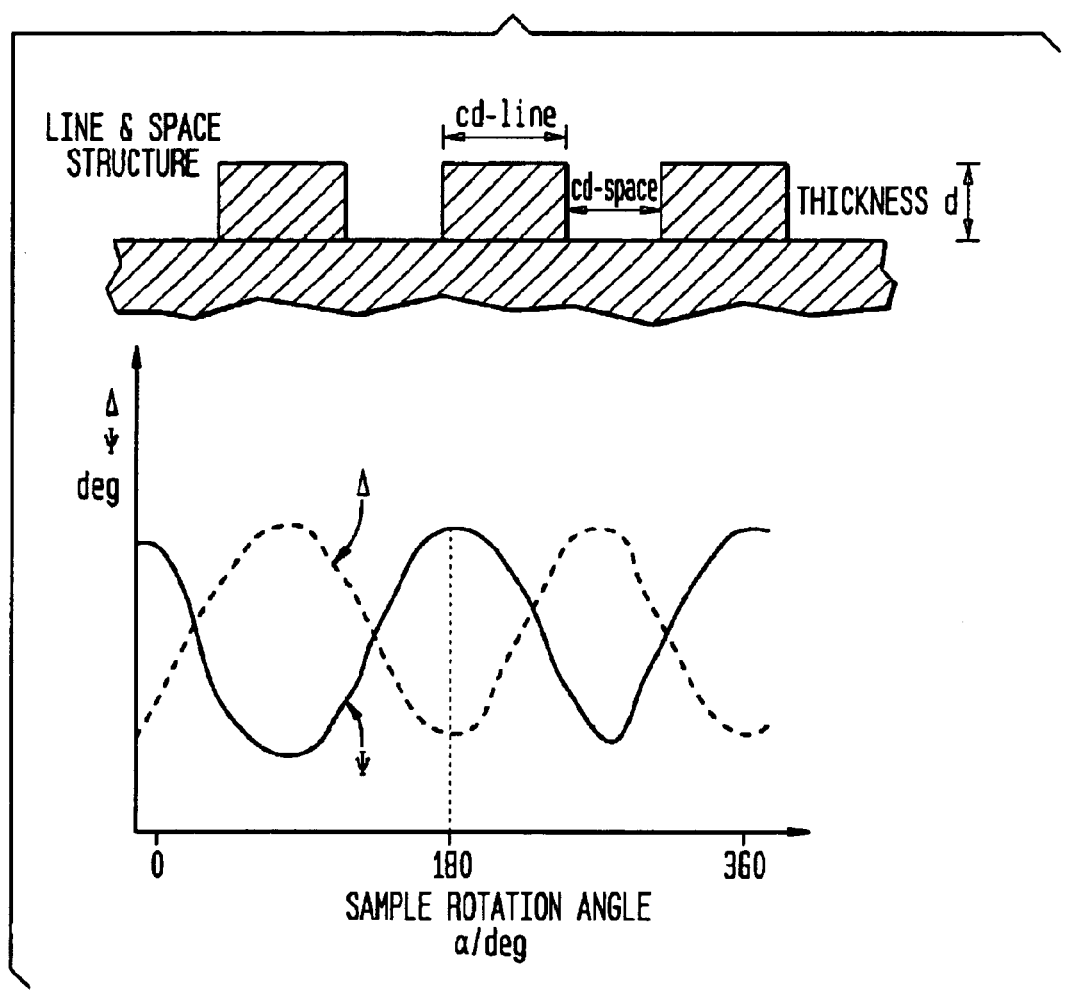
FIG. 2B is an illustration of an ellipsometric measurement of a line and space structure.
Figure 3:
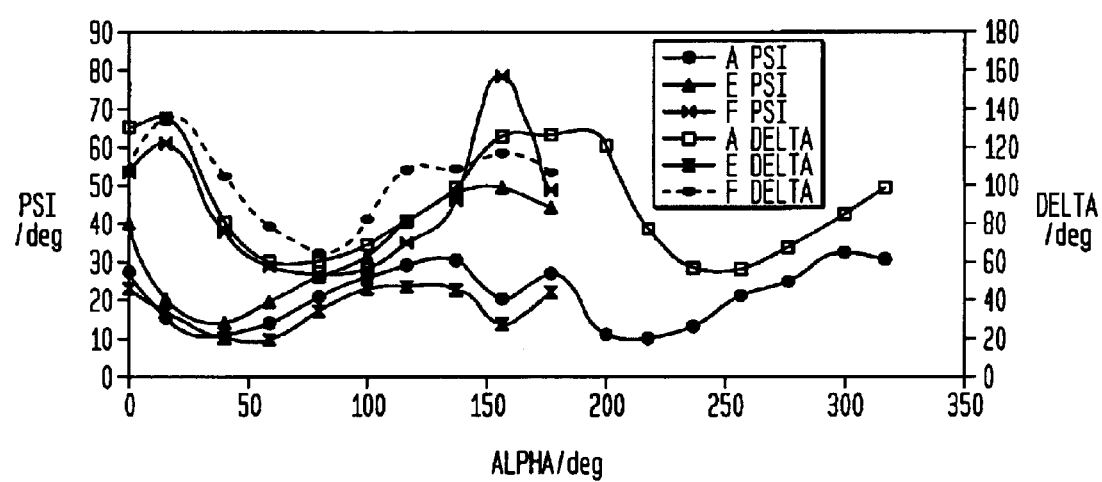
FIG. 3 is a plot showing $\Psi$ and $\Delta$ as a function of rotation angle $\alpha$ in accordance with the invention.

Referring to FIGS. 1, 2 and 3, corresponding measurements of Δ/degrees (delta) and Ψ/degrees (psi) as a function of sample rotation around a surface normal (angle α) for two different samples are illustratively shown in FIG. 2.

In order to illustrate the principle of the disclosed AME method in comparison to conventional ellipsoemtry, FIG. 2A shows an ellipsometric measurement on a sample without any features (i.e., homogeneous isotropic surface). In this case, the ellipsometric measurable parameters Δ and Ψ show no dependence on the sample rotation around the angle α. This is the case of conventional ellipsometry. Consequently, in conventional ellipsometry, the sample is not rotated at all, and the measurement of Δ and Ψ are performed at one fixed angle α only.

Oppositely, in case of line and space structure shown in FIG. 2B, a sine-like variation of Δ and Ψ in dependence on the rotation angle α occurs. This is due to the form birefringence of this structure. This is the case of AME. The analysis of these Δ (α) and Ψ (α) curves allows for a complete determination of the anisotropic optical parameters (i.e., the dielectric tensor) of the structure. These optical parameters (dielectric tensor) are correlated with the critical dimensions as is exemplified by the equation above. Therefore, the AME measurement of Δ (α) and Ψ (α) curves of any structure showing form birefringence allows for the determination of its critical dimensions. Thus, contrary for a periodic line and space structure, sine-like Δ (α) and Ψ (α) curves are observed (this is the case of AME). The amplitudes of these sine-like curves can be correlated to the cd of the line and space structures as is shown in FIG. 2C.

FIG. 3 shows such Δ (α) and Ψ (α) curves for three different line and space structures (for example a gate conductor GC level in a memory chip having parallel lines in developed resist) with different cd's. The cd's for the different chips were: Chip F=224 nm, chip A=249 nm, chip E=280 nm, the pitch was constant in all cases (440 nm)). These chips and dimensions are examples only and used to demonstrate the capabilities of the present invention for comparison.

The measurements were performed applying a spectroscopic ellipsometer. The samples were rotated on a stage in 20 degrees steps. This rotation is described by the angle α for all cd's a large variation of Δ and Ψ as a function of α is observed. This variation covers a range of 100 degrees in Δ and 30 degrees in Ψ which is extremely large if the ellipsometer resolution of 0.01 degrees is considered.

Each of the shown Δ (α) and Ψ (α) curves can be characterized by three quantities, namely the average value, the amplitude, and the phase. By a conventional fit procedure, as is well known in the art, for example a sum of the squares fit, the components of the dielectric tensor can be determined using these curves. For this, the generalized ellipsometry (GE) formalism which is well known in the art can be applied. See, e.g., "Thins Solid Films" 274 (1996) 82–94 by A. Michael is and J. W. Schultze for a detailed mathematical discussion, the entire contents of which are incorporated herein by reference. This tensor conversion may be implemented using one or more programmed processors. The processors may include software programs for implementing the conversion. This quantitative approach allows determination of the dielectric tensor. Subsequently, both lateral and vertical feature sizes (ed and thickness) can be derived using the equation above.

Depending on the geometry of the structures, an accuracy in the sub-nm-range can be estimated. Alternately, without a quantitative determination of the dielectric tensor, the method of the present invention can be used if a calibration approach is taken. For this, the cd-values of a test structure are to be measured by means of any independent method (for example using SEM, AFM, etc.). Subsequently these values can be correlated with the corresponding amplitudes or/and the minimum maximum values of the Δ and Ψ curves.

Figure 4:
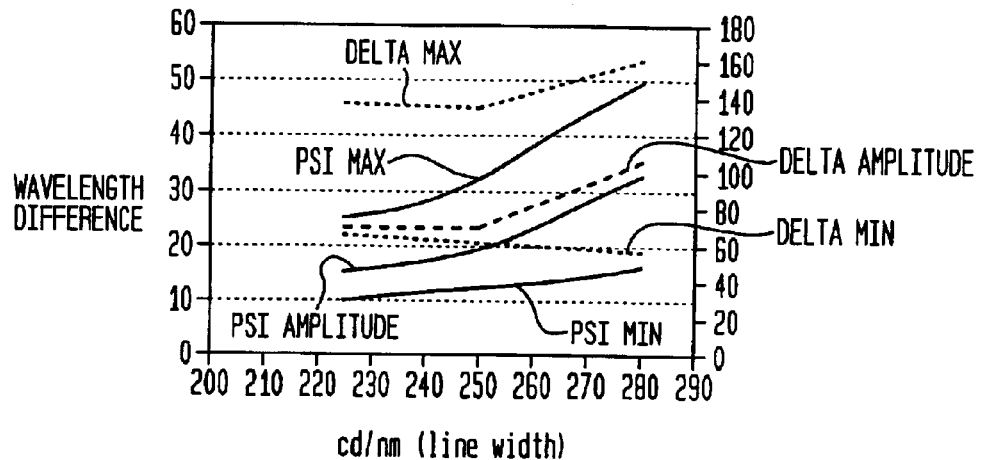
FIG. 4 is a critical dimension calibration curve in accordance with the present invention.
Figure 5:
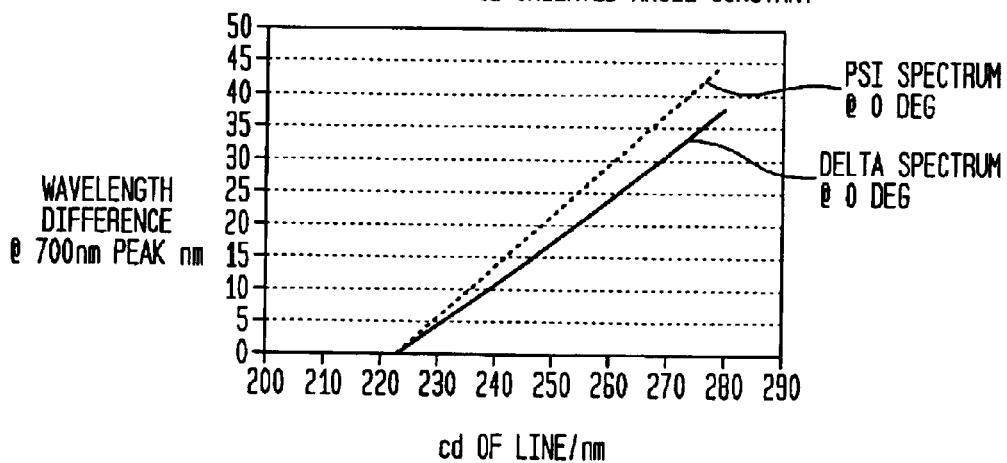
FIG. 5 is a spectra calibration curve in accordance with the present invention.
Figure 6:
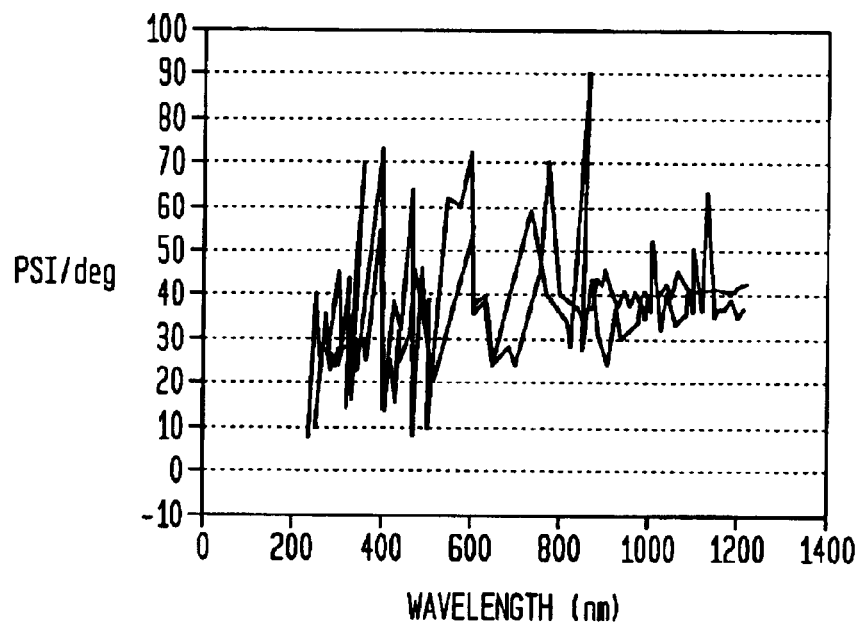
FIGS. 6 and 7 are ellipsometric spectra of $\Psi$ ($\alpha$) and $\Delta$ ($\alpha$), respectively, taken on the structure of FIGS. 2A and 2B, showing peaks at around 700 nm which are used to generate the calibration curve in FIG. 5.
Figure 7:
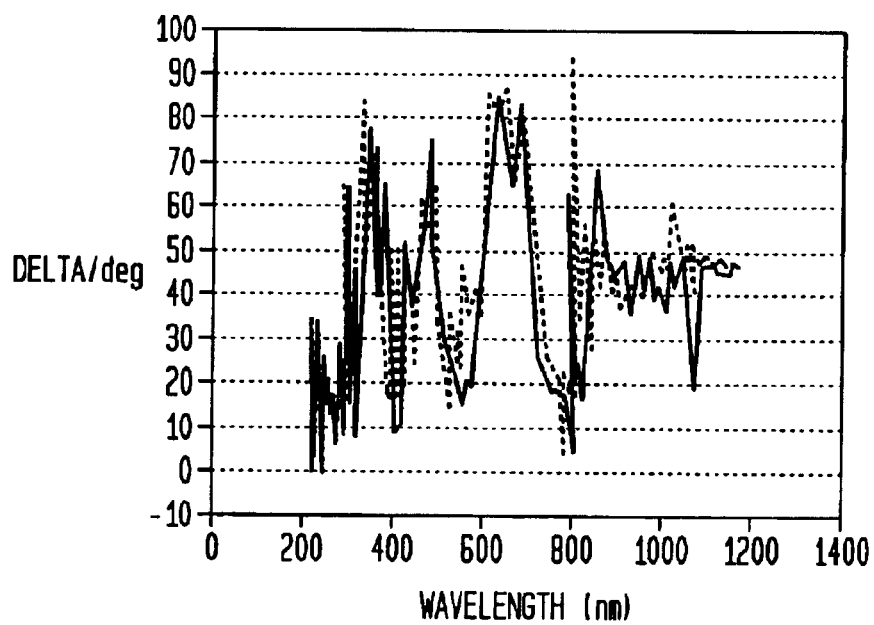

Referring to FIG. 4, illustrative calibration curves are shown for the above cited case of the GC-line structure of FIG. 3. From these curves a cd-resolution in the sub-nm regime can be estimated considering the ellipsometric resolution of 0.01 degrees in delta (Δ) and psi (Ψ). Alternatively, a calibration curve can be generated directly from the ellipsometric spectra. For this a characteristic peak in the Δ and Ψ spectra has to be chosen. Subsequently, the wavelength shift of this peak can be determined by the dependence on the cd-change. A corresponding curve is generated and shown in FIG. 5. The resolution of this approach may be slightly lower due to limited wavelength resolution of spectroscopic measuring devices. The original spectra for the illustrative example shown in the above FIGS. are shown in FIG. 6 and FIG. 7.

Figure 11:
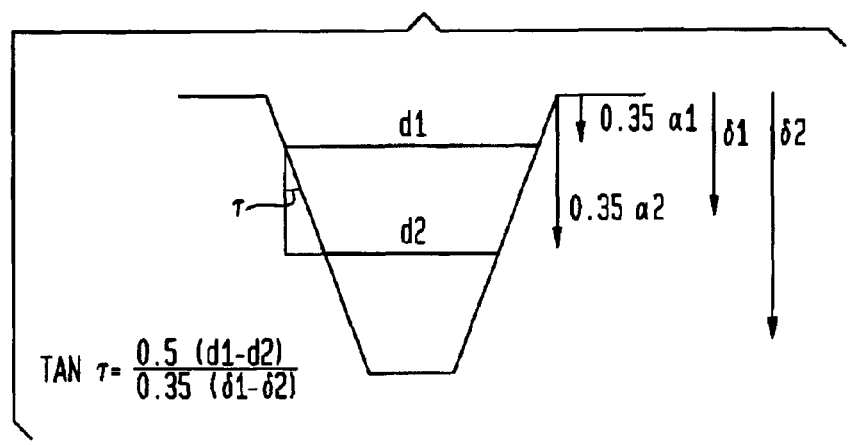
FIG. 11 is a sketch of one surface feature, such feature having a taper angle $\tau$.

Referring now to FIG. 11, a tapered feature is shown. Here, for example, the feature is a trench in the surface of a silicon substrate. Such a trench is used in a DRAM cell having a trench capacitor. Thus here instead of the feature having a constant cd-space as a function of thickness, d, as shown in FIG. 2B, the cd-space is a function, d, is a function of depth δ. Here, in the example in FIG. 11, the trench is assumed circular in cross section and has a diameter $d_1$ at depth $\delta_1$ and a diameter $d_2$ at a depth $\delta_2$. The trench may be characterized by a slope τ, where $$\tan \tau = \frac{.5(d_1 - d_2)}{.35(\delta_2 - \delta_1)}$$

The averaged diameter d of the structures assuming a circular parameter is given by:

$$d = \sqrt{(\text{cell-area})/\pi},$$

where the cell area depends on the technology (e.g. Cronus uses a 9.98 $F^2$ cell area where F=0.2 micrometers) and simply describes the periodicity of the structure. It is to be noted that d describes a lateral diameter which is averaged over the vertical penetration depth δ of the light, i.e., d describes the structure diameter in a depth x=ln(2)/2*δ if an exponential approach according to Lambert-Beer's Law for light absorption is used, as illustrated in FIG. 11. Therefore, measurement of d for different penetration depths with $\delta_2 > \delta_1$ allows determination of the taper angle τ. As shown in FIG. 11, the correlation between τ and the penetration depths and diameters is given by the equation:

$$\tan \tau = \frac{.5(d_1 - d_2)}{.35(\delta_2 - \delta_1)}.$$

The penetration depth of the impinging light on the surface of the structure is determined according to $\delta = \lambda/(2nk_{ave})$, where λ is the wavelength of such light and $k_{ave}$ is the average absorption coefficient. As illustrated in FIG. 11, determination of N and f for two different depths (δs) is sufficient considering structures with a constant taper angle, τ. For bowed profiles a continuous δ-variation is needed. Once the dielectric tensor N(λ) is measured $N_{ave}$ can be derived and the volume fraction f(λ) can be determined applying the BEMA-equation presented above. The N(λ) of the constituents can be measured independently applying conventional ellipsometry.

Figure 14:
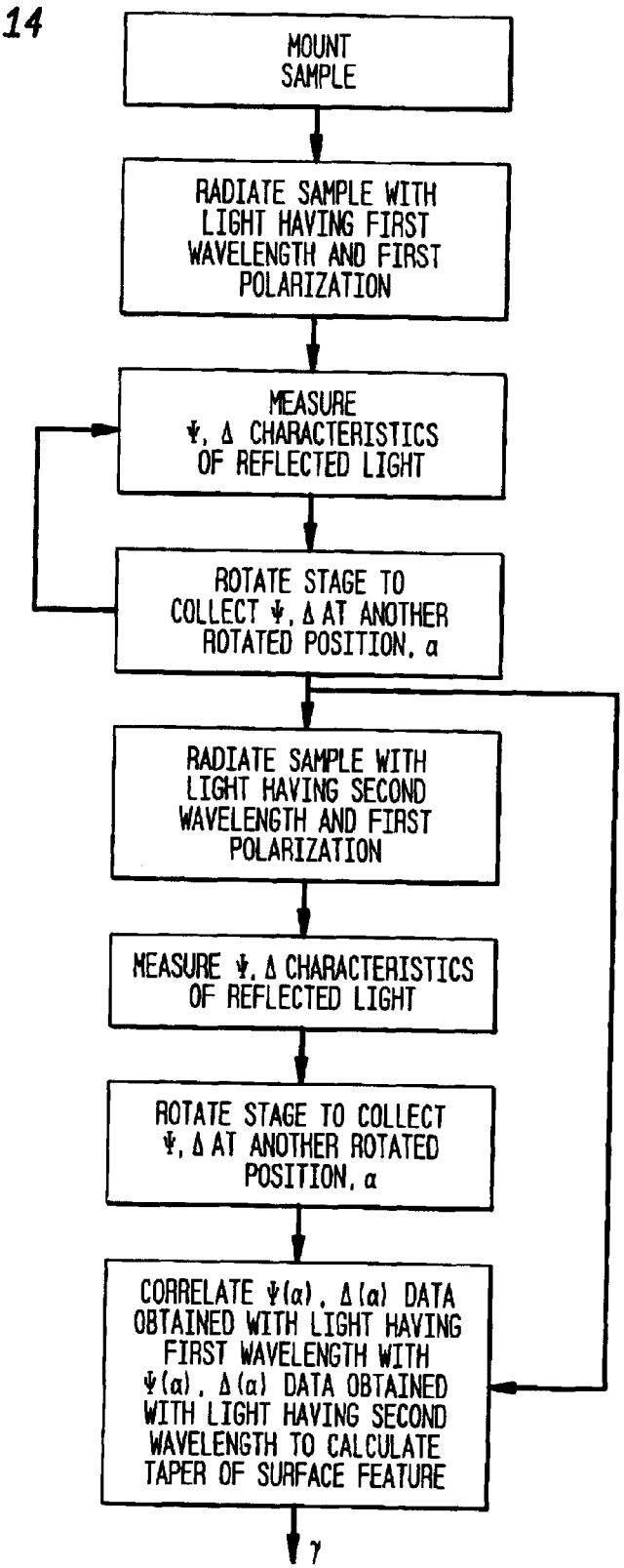
FIG. 14 is a flow diagram showing the steps for measuring the taper angle $\tau$ of a structure having an array of lines and spaces, each one of such lines having the surface feature shown in FIG. 11.

Thus, referring to FIG. 14, a method is provided for measuring the taper of a surface feature. The method includes radiating the surface feature with light having a first wavelength and a first polarization. A measurement is made of the reflected polarization of light having the first wavelength reflected from the surface features. The surface feature is rotated to measure the reflected polarization of the reflected light having the first wavelength at least one new rotated position. The surface feature is radiated with light having a second wavelength and the first polarization. A measurement is made of the reflected polarization of light having the second wavelength reflected from the surface features. The surface feature is rotated to measure the reflected polarization of the reflected light having the second wavelength at least one new rotated position. The reflected light having the first and second polarizations are correlated to determine the taper of the surface features.

Figure 12A:
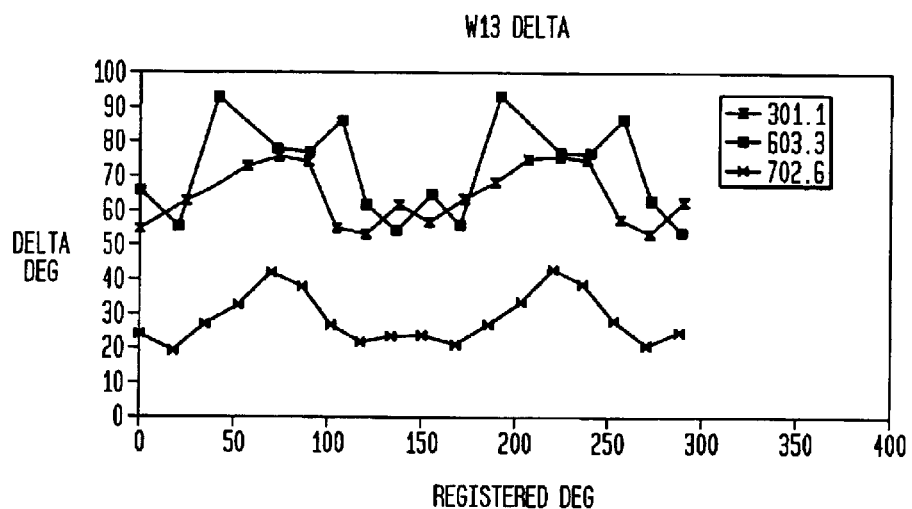
FIG. 12 are plots of $\Delta$ as a function of $\alpha$ for two of the surface features of FIG. 11, each surface feature having a different taper angle $\tau$
Figure 12B:
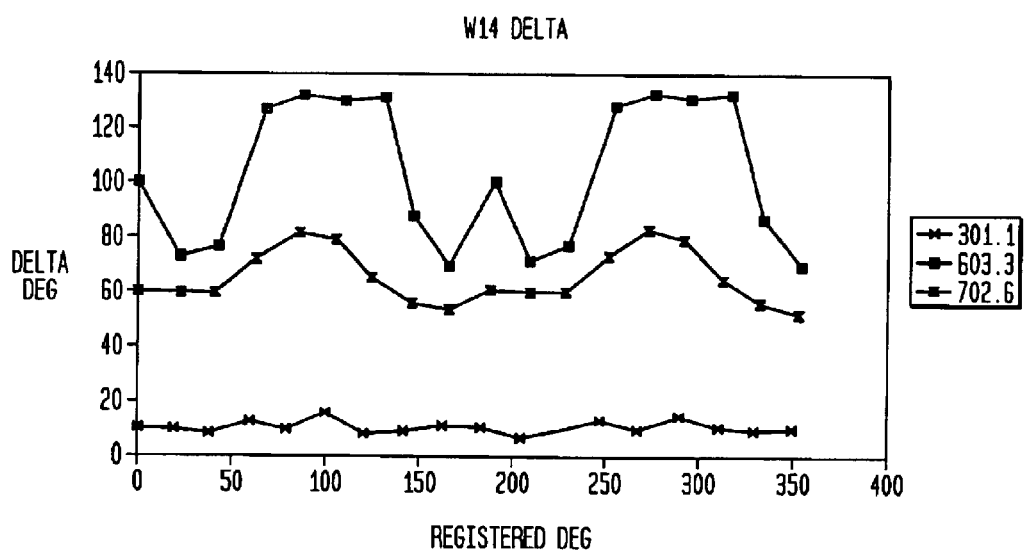

Referring now to FIG. 12, SAME measurements of $\Delta$ as a function of sample rotation around the surface normal (angle $\alpha$) for two depth trench structures with different taper angles are shown. The $\Psi$ measurements look similar. The measurements were performed directly after a silicon etch and hard mask strip. For comparison, the taper angles were determined by SEM cross-sections to 3.6 degrees and 6 degrees for two different sample referred to as "W14" and "W13", as indicated. The top cd of both samples was exactly equal to 270 nm*400 nm. Therefore, the differences in the measured curves shown below are solely due to the different taper angles. The measurements were performed applying a conventional spectroscopic ellipsometer (Tencor) by rotating the samples manually in 20 degree steps. In all cases a large variation in $\Delta$ and $\Psi$ as a function of $\alpha$ is observed here, the ellipsometer resolution is 0.01 degrees.

Each one of the $\Delta$ and $\Psi$ curves can be characterized by three quantities—namely: the average value; the amplitude; and the phase;—thereby yielding six independent parameters. By a conventional fit procedure, the components of the dielectric tensor can be determined using these curves. Alternatively, a calibration approach can be used. For this, the cd- or f-values of a test structure are to be measured by any independent methods, for example, by an SEM, as a function of structure depth (cross-sections). Subsequently, these values can be correlated with the corresponding amplitudes or/and the minimum/maximum values of the $\Delta$ and $\Psi$ curves for at least two different penetration depths, $\delta$.

Figure 13A:
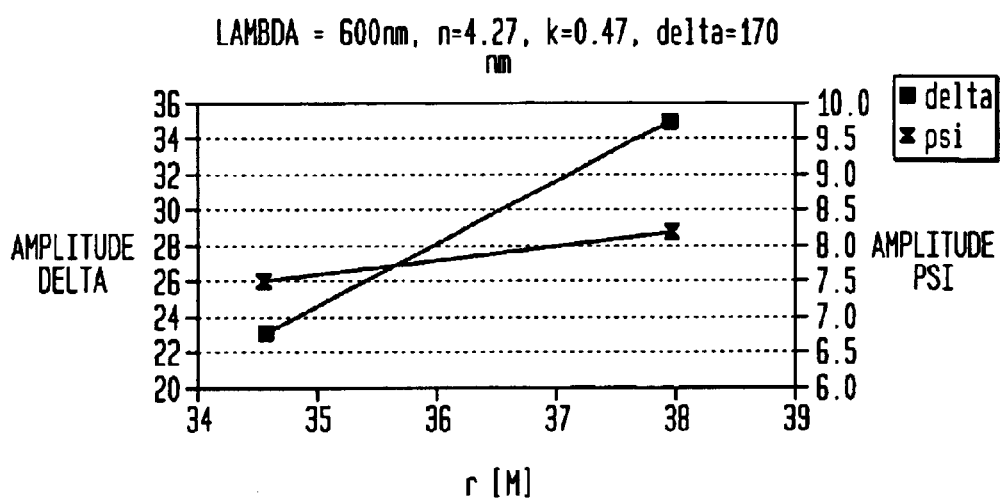
FIG. 13A is a plot of the amplitude of $\Delta$ as a function of scalar volume fraction, f, for the surface feature of FIG. 11 having a depth $\delta$=170 nm, such curve being a SAME f-calibration curve.
Figure 13B:
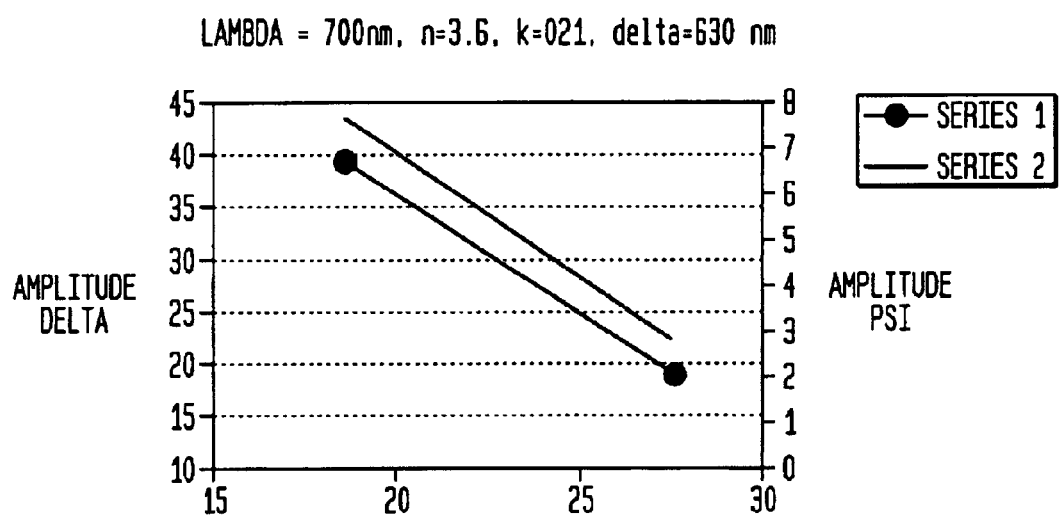
FIG. 13B is a plot of the amplitude of $\Delta$ as a function of scalar volume fraction, f, for the surface feature of FIG. 11 having a depth $\delta$=530 nm, such curve being a SAME f-calibration curve.

Referring to FIGS. 13A and 13B, such calibration curves are shown for the example discussed above for two $\delta$s (170 nm and 530 nm in silicon). From these curves, a f-resolution of about 0.1% can be estimated considering the ellipsometric resolution of 0.01 degrees in $\Delta$ and $\Psi$. Applying these curves to structures of the same geometry as the test-structure allows determination of both cd and taper angles using the equations presented above.

Figure 8:
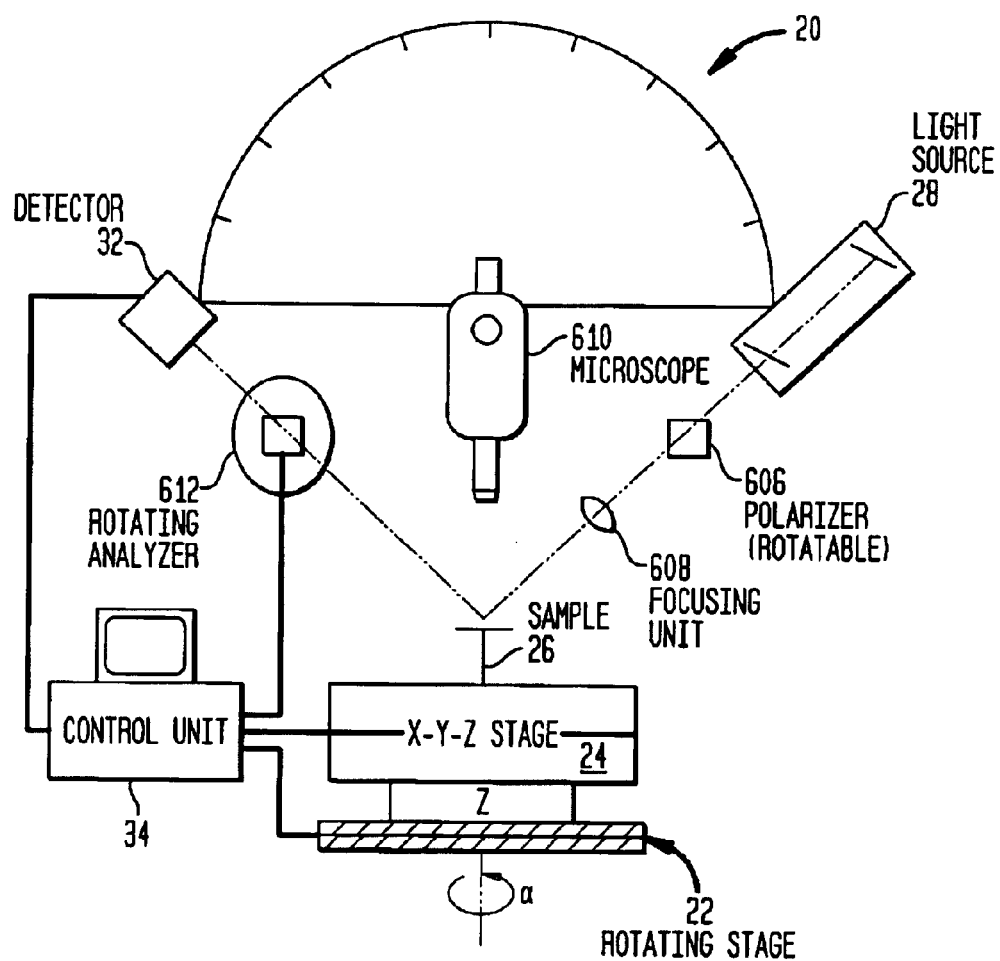
FIG. 8 is a schematic diagram of a system for measurement in accordance with the present invention.

Referring to FIG. 8, an apparatus 20 for measuring internal film stress on a sample 26 at high lateral resolutions is shown. The apparatus 20 comprises an ellipsometer and a rotating stage 22. The rotating stage 22 is rotatably disposed below the ellipsometer for rotating the sample to vary the angle of rotation $\alpha$ around a center of rotation axis. The ellipsometer measures ellipsometric parameters $\Delta$ and $\Psi$ by directing a linearly polarized incident light onto a selected area of sample 26 to generate an elliptically polarized reflected light. The ellipsometer compares the linearly polarized incident light and the elliptically polarized reflected light to measure the ellipsometric $\Delta$ and $\Psi$ values. In contrast to conventional elilipsometers, apparatus 20 can measure ellipsometric parameter $\Delta(\alpha)$ and $\Psi(\alpha)$ curves as a function of sample rotating angle $\alpha$.

Referring to FIG. 8, the ellipsometer comprises a light source 28 (e.g., a laser beam, monochromator, polychroinator, diode detector array, etc.), a polarizer 606, a focusing unit 608, an x-y-z stage 24, a microscope 610, a rotating analyzer 612, a detector 32, and a control unit 34. Light source 28 generates an incident light such as a laser beam, a light beam, or any type of light. In particular, a light source which can be tuned in wavelength can be used to implement a spectroscopic method. Polarizer 606 receives the incident light and linearly polarizes it. Focusing unit 608, such as a lens, receives the light and focuses the linearly polarized light to provide and resolve high lateral resolutions on the surface of sample 26. Sample 26 is disposed on x-y-z stage 24, which changes the position of sample 26 in x, y and z directions. Microscope 610 is aligned to the center of rotation of the rotating stage 22 for selecting an area of sample 26 to determine critical dimensions.

With reference to FIG. 6, the focused and linearly polarized incident light is directed to the selected area of sample 26 and is then reflected off sample 26 to generate elliptically polarized reflected light. Rotating analyzer 612 receives the elliptically polarized reflected light and transforms the polarization state to an intensity change. Analysis of this intensity signal allows determination of ellipsometric parameters $\Delta$ and $\Psi$. Detector 32 receives the reflected light through rotating analyzer and detects the light intensities to generate ellipsometric parameters $\Delta$ and $\Psi$ in terms of light intensity. Control unit 34 is coupled to detector 32, rotating analyzer 612, x-y-z stage 24, and rotating stage 22 for coordinating these units. Control unit or CPU 34 receives and correlates the ellipsometric parameters $\Delta$ and $\Psi$ from detector 32 to the angle of rotation, $\alpha$, to determine critical dimensions (cd) at the selected area of sample 26. This configuration allows selection of an arbitrary position on sample 26 (i.e., mapping) and to rotate it without affecting the ellipsometric alignment. In addition, the angle of incidence and the polarizer angle are adjustable. By thus rotating the sample under the ellipsometer, apparatus 20 allows measurement of ellipsometric parameters $\Delta$ and $\Psi$, and ellipsometric parameter curves $\Delta(\alpha)$ and $\Psi(\alpha)$ for determining critical dimensions on sample 26 by using the techniques described above.

Figure 9:
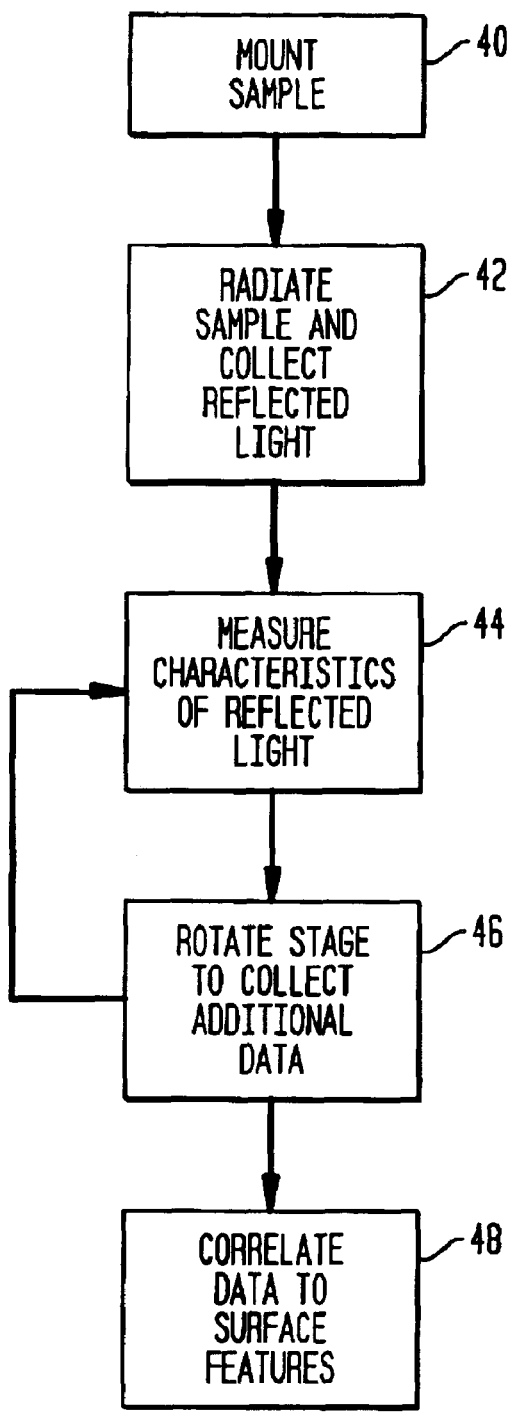
FIG. 9 is a flow diagram showing the steps for measuring vertical and lateral dimensions in accordance with the present invention.
Figure 10:
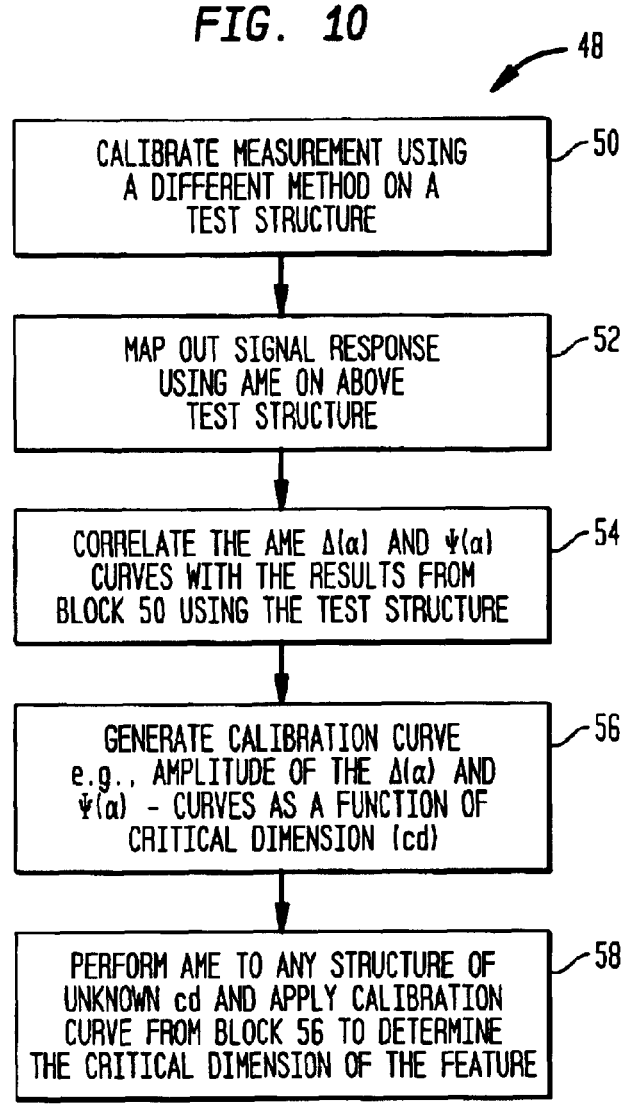
FIG. 10 is a flow diagram showing alternative steps for correlating measurements to surface features in accordance with the invention.

Referring to FIG. 9, a method for measuring lateral and vertical surface features on a sample includes the following steps. In block 40, a sample is mounted on a rotating or revolving stage. In block 42, radiation is provided incident on the sample and is reflected therefrom preferably by an ellipsometer. In block 44, the reflected light is measured and the characteristics are recorded. In block 46, the stage is further rotated a predetermined amount and additional data is taken. This process is repeated until enough data is accumulated to determine the dielectric tensor or to characterize the data and correlate the data to surface features in block 48 using the equation above.

As noted above in connection with FIG. 14, the process is repeated with light having the same polarization but with a different wavelength in order to computer the taper $\tau$ (FIG. 11) of a surface feature.

Figure 15A:
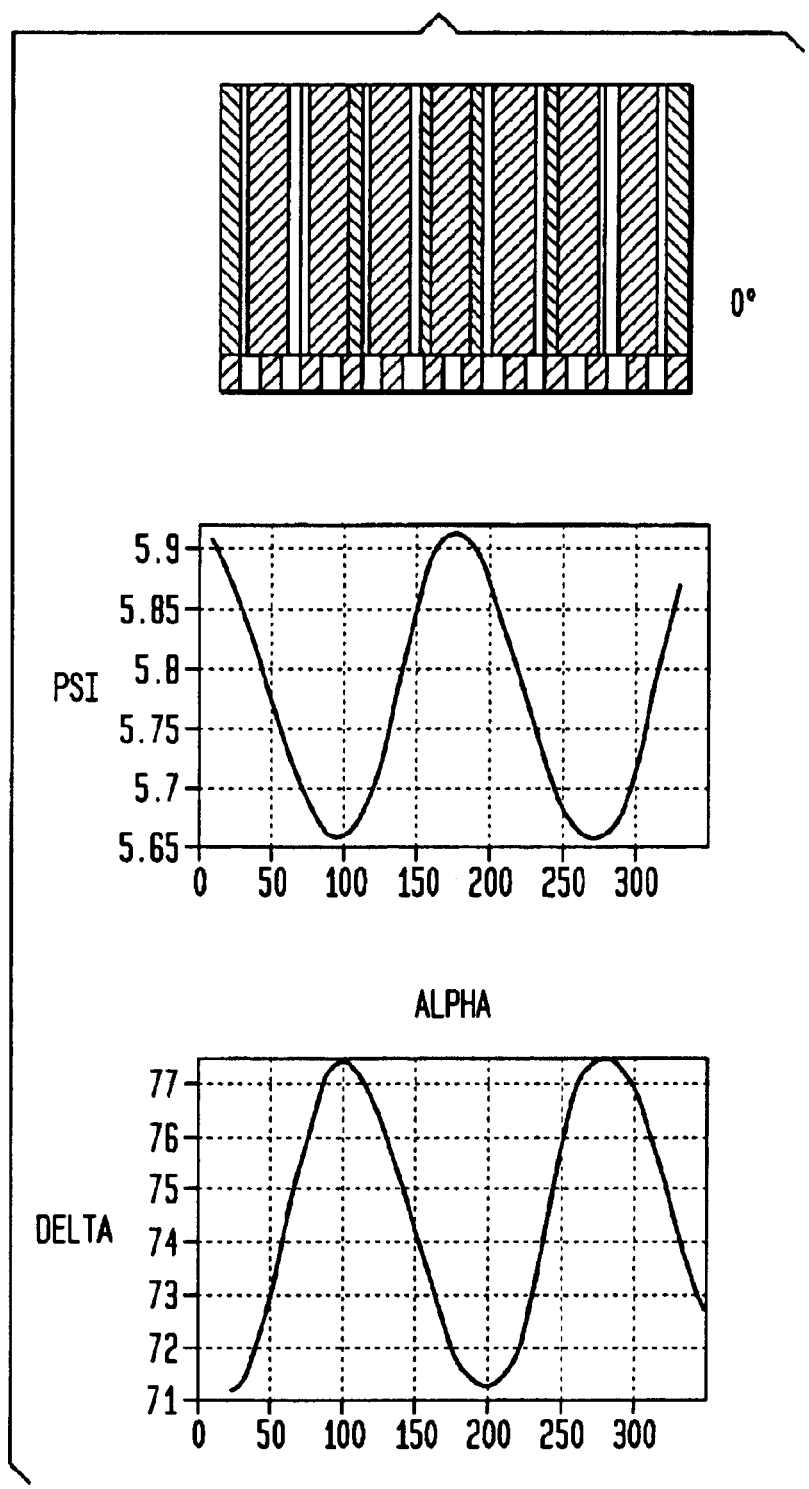
FIGS. 15A and 15B, show: the alignment between a lower pattern and an overlaying upper pattern; $\Psi(\alpha)$; and $\Delta(\alpha)$; for two different relative angular rotations, diff$\alpha$, of the first and second patterns, respectively, in accordance with the present invention.
Figure 15B:
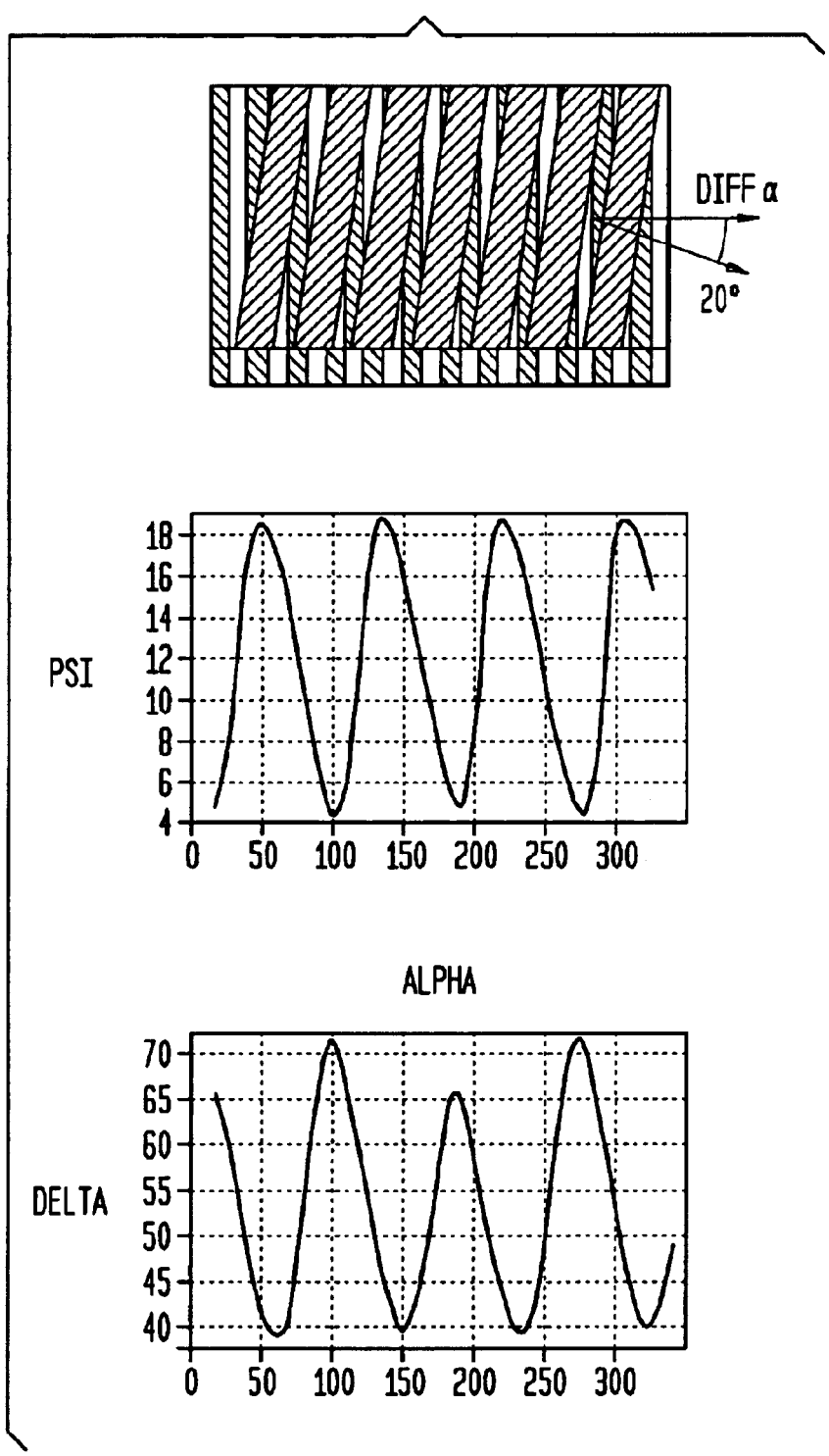
Figure 16:
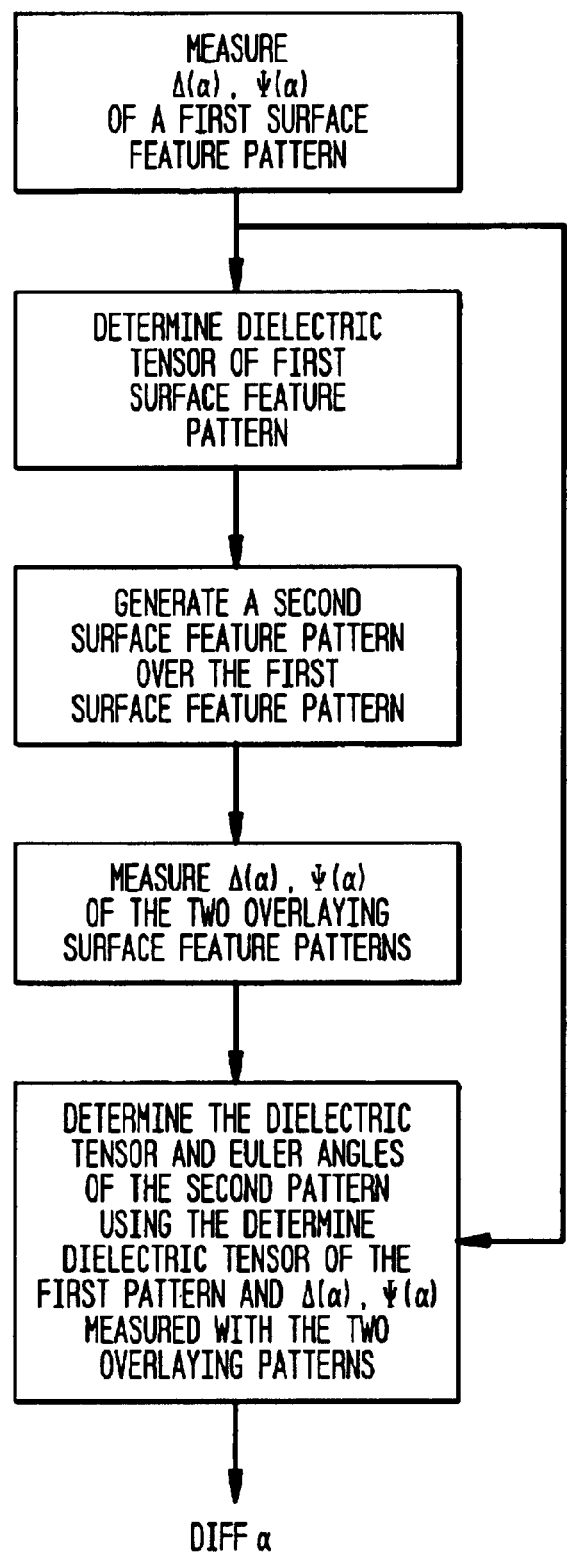
FIG. 16 is a flow diagram showing the steps for measuring the relative rotation, diffα, of the first and second patterns shown in FIG. 15 according to the invention.

Referring now to FIGS. 15A and 15B, the apparatus shown in FIG. 8 can be used to determine the amount of relative rotation between two overlaying printed masks levels. FIG. 15A shows an ideal condition where there is no rotation (i.e., the non-rotation condition where the orientation of the optical axis of the top line and space pattern is parallel to the optical axis of the underlying line and space structure). FIG. 15B shows a condition where there is a rotation, here, for example, 20 degrees between the orientation of the optical axis of the top line and space pattern and the optical axis of the underlying line and space structure). It is noted that the direction of the optical axis for any line and space structure is perpendicular to the lines and spaces. It is also noted that the two cases shown in FIGS. 15A and 15B only differ in the angle, diff$\alpha$, between the two optical axes of both patterns which is zero degrees in FIG. 15A and twenty degrees in FIG. 15B. Therefore, with known components of the dielectric tensor, only one parameter, namely, the difference angle diff$\alpha$ between the optical axes, is determined. Only this parameter diff$\alpha$ causes the difference between the $\Delta(\alpha)$ and $\Psi(\alpha)$ curves. This leads to the following procedure, as shown in FIG. 16, for determining diff$\alpha$:

First, measure $\Delta(\alpha)$ and $\Psi(\alpha)$ curves of a first pattern showing birefringence;

Second, determine the dielectric tensor components of the first pattern by fitting the measured $\Delta(\alpha)$ and $\Psi(\alpha)$ curves of this first pattern;

Third, generate a second pattern over the first pattern;

Fourth, measure $\Delta(\alpha)$ and $\Psi(\alpha)$ curves of this two overlaying patterns;

Fifth, determine both the dielectric tensor and the Euler angles of the second pattern using the aforementioned dielectric tensor of the first pattern as known parameters.

Thus, considering the example shown in FIGS. 15A and 15B, the measured curves of the anisotropic bottom layer (i.e., pattern) are shown for a wavelength of 632.8 nm, an angle of incidence of 70 degrees, a polarizer angle of 45 degrees. (These parameters can be varied to monitor additional $\Delta(\alpha)$ and $\Psi(\alpha)$ curves leading to spectroscopic multiple angle of incidence ellipsometry). The Euler angles for the non-rotation case (FIG. 15A) are $\Phi=0$ (space and line structures are uniaxial, therefore this angle is not significant here), $\Phi=90$ degrees (the optical axis of any pattern showing form birefringence lies in the sample surface), and $\alpha$ is varied as shown.

The $\Delta(\alpha)$ and $\Psi(\alpha)$ curves in FIG. 15B are the measured curves of the second layer over the first layer. The process yields the following parameters: $\epsilon_0=2.6+0.5i$; $\epsilon_{\alpha 0}=2.13+0.2i$; diff$\alpha=20$ degrees, where $\epsilon_0$ and $\epsilon\alpha_0$ are dielectric tensors for cases without and with rotation, respectively. The corresponding curve for the case of diff$\alpha=0$ degrees is shown in FIG. 15A as well. In order to derive all parameters ($\epsilon_0$, $\epsilon_{\alpha 0}$ and diff$\alpha$, i.e., five unknown parameters if one takes into consideration that $\epsilon$ is a complex number), in principle, one AME measurement is sufficient because $\Delta(\alpha)$ and $\Psi(\alpha)$ curves are characterized by five quantities, namely, the average value, the amplitude, and the phase, yielding five independent parameters. Therefore, using any conventional curve fit procedure, the five aforementioned unknowns can be determined.

In order to improve the reliability of this approach additional AME A(c~) and 'I'(cL) measurements at different ellipsometric angles of incidence or/and polarization angles can be performed.

Thus, here again, the physical phenomenon of form birefringence is used to measure both the lateral dimensions (cd) of sub-micron periodic patterns and the rotation of one pattern with respect to a second underlying periodic pattern. It should be noted that the $\Delta(\alpha)$ $\Psi(\alpha)$ curves for the non-rotation condition and the rotation condition are different.

Having described preferred embodiments for a novel system and method for measuring lateral and vertical surface features in the sub-quarter micron regime (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. For example, any ellipsometer with a micro-sppot option can be used if a revolving stage is added. However, the alignment as well as the data acquisition procedure must be modified. For example, different types of ellipsometers are available with different optical setups and configurations. The method can be applied on-line at high local resolution.

Having thus described the invention with the details and particularly required by the patent laws, what is claimed and desired protected by Letters Patent is set forth in the appended claims.

What is claimed is:

1. A system for measuring a property of surface features having form birefringence, comprising:
   a radiation source operable to provide radiation having a selectable wavelength that is incident onto a surface;
   a stage for holding the surface;
   a radiation detecting device operable to measure characteristics of the incident radiation after being reflected from the surface, a first such measurement being taken after a first pattern is formed on the surface, and a second such measurement being taken after a second pattern is formed atop the first pattern; and
   a processor operable to process the measured characteristics of the reflected light for the first and second measurements and to correlate the measured characteristics of the reflected light of the first measurement with the measured characteristics of the reflected light of the second measurement and thereby determine the amount of relative rotation between the first pattern and the second pattern.

2. The system as recited in claim 1, wherein the processor is operable to correlate the measured characteristics of the reflected light of the first and second measurements using a formula relation between a complex index of refraction of the reflected light and the amount of relative rotation.

3. The system as recited in claim 1, wherein the incident radiation includes linearly polarized light.

4. The system as recited in claim 1, wherein the reflected light includes elliptically polarized light.

5. The system as recited in claim 1, wherein the radiation source and the radiation detecting device comprise an ellipsometer.

6. The system as recited in claim 5, wherein the measured characteristics of the reflected light of the first measurement include the ellipsometric measured parameters of the reflected light of the first measurement, the measured characteristics of the reflected light of the second measurement include the ellipsometric measured parameters of the reflected light of the second measurement, and the processor is operable to determine the Euler angles of the second pattern from the ellipsometric measured parameters of the reflected light of the first and second measurements.

7. A method for measuring a property of surface features having form birefringence, said method comprising:
   providing a surface having first surface features disposed thereon;
   radiating the first surface features with light having a selected wavelength and an incident polarization;
   measuring a first reflected polarization of light reflected from the first surface features;
   forming second surface features atop the first surface features of the surface;
   radiating the second surface features with light having the selected wavelength and the incident polarization;
   measuring a further reflected polarization of light reflected from the second surface features; and
   processing the measured first reflected polarization and the measured further reflected polarization to determine the amount of relative rotation between the first pattern and the second pattern.

8. The method as recited in claim 7, wherein the step of providing the surface includes providing a semiconductor device having the first surface features thereon.

9. The method as recited in claim 7, wherein the incident polarization is a linear polarization.

10. The method as recited in claim 7, wherein the steps of measuring the first and further reflected polarizations includes measuring ellipsometric angles of the reflected light.

11. The method as recited in claim 7, wherein the processing step includes developing a respective dielectric tensor for each of the first and second patterns.

* * * * *

UNITED STATES PATENT AND TRADEMARK OFFICE
CERTIFICATE OF CORRECTION

| | |
|---|---|
| PATENT NO. | : 7,046,363 B2 |
| APPLICATION NO. | : 10/236448 |
| DATED | : May 16, 2006 |
| INVENTOR(S) | : Michaelis et al. |

It is certified that error appears in the above-identified patent and that said Letters Patent is hereby corrected as shown below:

Title Page

Section (75) Inventors:
    Delete "Oliver Genz, Saxony" and insert --Oliver Genz, Dresden--.
    Delete "Ulrich Mantz, Saxony" and insert --Ulrich Mantz, Dresden--.

Signed and Sealed this

Twenty-fourth Day of October, 2006

JON W. DUDAS
*Director of the United States Patent and Trademark Office*